No. 613,574. Patented Nov. 1, 1898.
O. JOHNSON & P. P. HOLT.
FEED REGULATOR.
(Application filed Apr. 2, 1897.)
(No Model.) 2 Sheets—Sheet I.
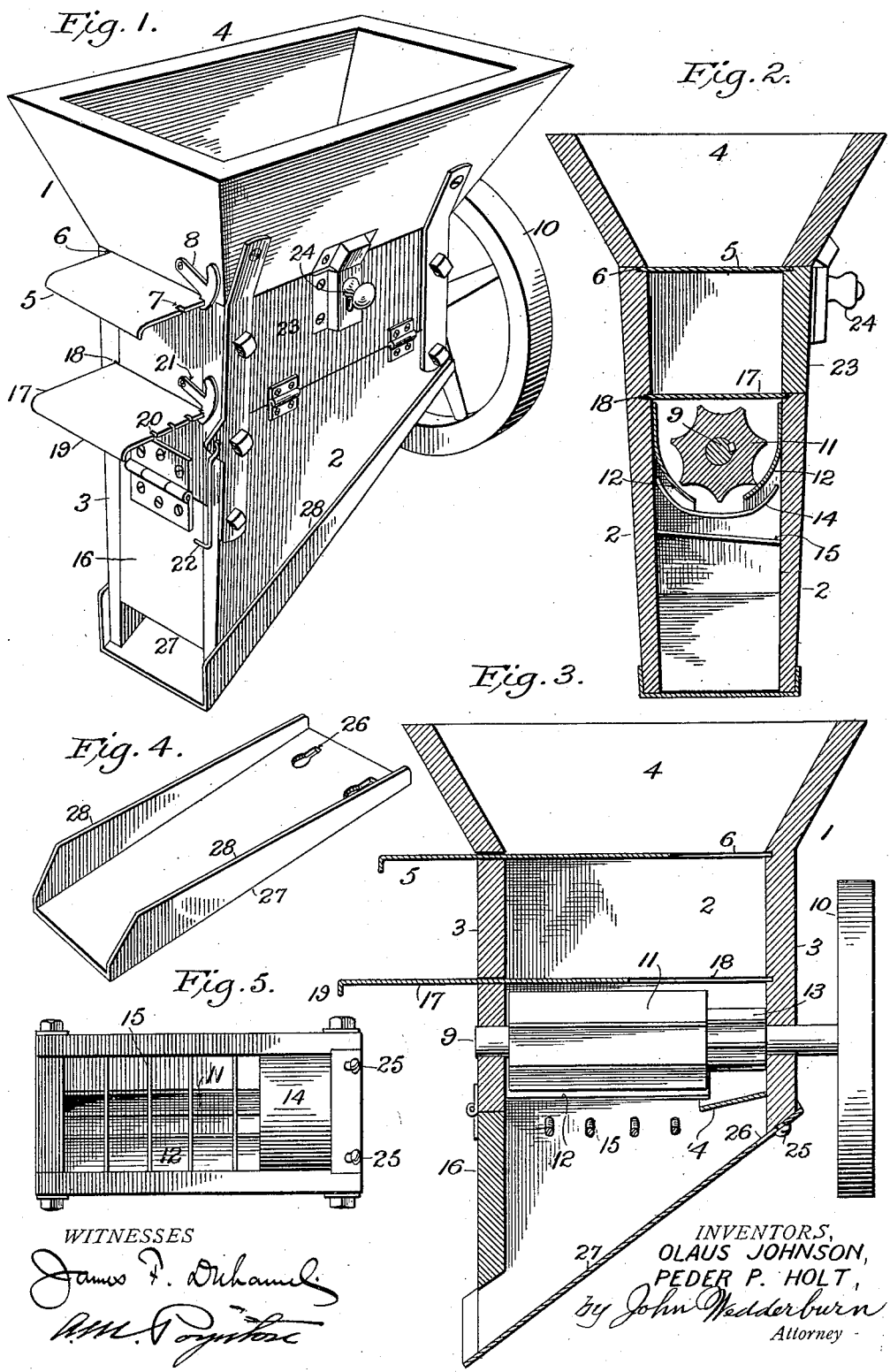
WITNESSES
INVENTORS,
OLAUS JOHNSON,
PEDER P. HOLT,
by John Wedderburn
Attorney No. 613,574. Patented Nov. 1, 1898.
O. JOHNSON & P. P. HOLT.
FEED REGULATOR.
(Application filed Apr. 2, 1897.)
(No Model.) 2 Sheets—Sheet 2.
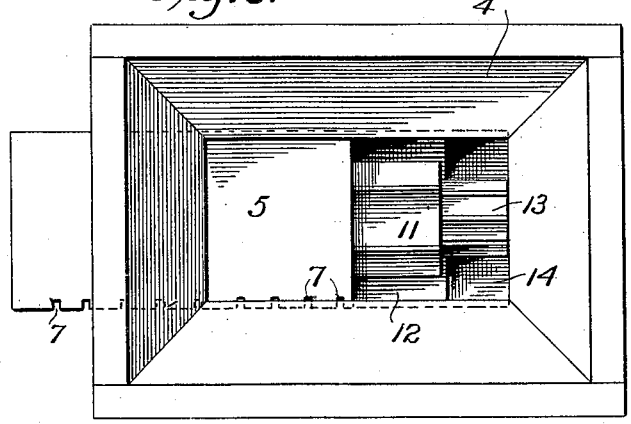
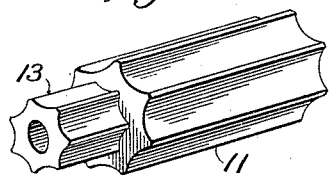
WITNESSES
INVENTORS,
OLAUS JOHNSON,
PEDER P. HOLT,
By John Wedderburn
Attorney

UNITED STATES PATENT OFFICE.

OLAUS JOHNSON AND PEDER P. HOLT, OF NORTHWOOD, NORTH DAKOTA.

FEED-REGULATOR.

SPECIFICATION forming part of Letters Patent No. 613,574, dated November 1, 1898.

Application filed April 2, 1897. Serial No. 630,407. (No model.)

*To all whom it may concern:*

Be it known that we, OLAUS JOHNSON and PEDER P. HOLT, citizens of the United States, residing at Northwood, in the county of Grand Forks and State of North Dakota, have invented certain new and useful Improvements in Feed-Regulators; and we do hereby declare the following to be a full, clear, and exact description of the invention, such as will enable others skilled in the art to which it appertains to make and use the same.

This invention relates to feed-regulators, and is especially designed for use upon roller-mills for feeding material uniformly to the burs. In addition to the means for regulating the flow of the material to the burs provision is also made for catching and holding nails, screws, and other hard objects or foreign matter and preventing the same from passing onward to the burs, which would result in injury to the latter and in the stoppage of the mill.

The detailed objects and advantages of the invention will be pointed out in the course of the subjoined description.

The invention consists in certain novel features, details of construction, and arrangements of parts, as hereinafter particularly set forth, illustrated in the drawings, and incorporated in the claims hereto appended.

In the accompanying drawings, forming part of this specification, Figure 1 is a perspective view of the casing containing the improved mechanism, showing also the hopper and cut-off and regulating slides. Fig. 2 is a vertical sectional view of the same. Fig. 3 is a vertical cross-section taken at right angles to Fig. 2. Fig. 4 is a detached perspective view of the removable bottom, and Fig. 5 is a bottom plan view with the bottom removed. Fig. 6 is a detail plan view of the hopper. Fig. 7 is a detail perspective view of the corrugated roller.

Like numerals of reference denote like parts in all the figures.

Referring to the drawings, 1 designates a substantially rectangular casing comprising sides 2 and ends 3. At the upper end of the casing is arranged a hopper 4, consisting of downwardly-sloping and inwardly inclining and converging sides and ends, connected to the casing 1 in any convenient manner. Arranged at the junction of the casing 1 and hopper 4 is a cut-off slide 5, constructed either from metal or wood and being substantially rectangular in plan, said slide being adapted to pass through a slot or opening 6 in one end of the casing and to move in grooves therein, said slide being provided at its outer end with an angular lip, forming a finger-hold, by means of which the slide may be operated. The slide is also provided along one of its edges with one or more notches 7, adapted to be engaged by a pivoted latch 8, whereby said slide may be held at any point. This slide serves to entirely cut off or arrest the flow of feed when any obstruction, such as nails, is to be taken out between the roller and side plates 12.

Extending through the casing is a shaft 9, provided at one end with a pulley or other form of wheel 10, by means of which motion is imparted to said shaft through a suitable belt. Within the casing and mounted upon the shaft 9 is a longitudinally fluted or corrugated roller 11, the said roller being fast on the shaft 9. Underlying the roller 11 and arranged at each side thereof are spring-plates 12, secured at one edge to the interior of the casing, the free edges of said plates being deflected or curved inwardly beneath the roller 11, so as to come close to the same and be adapted, by reason of such proximity and their elasticity, to regulate the flow of feed, preventing it running down between either plate and the roller faster than the latter rotates. The space normally existing between the roller and side plates is necessary to prevent clogging when unclean grain is being fed through the machine. One end of the roller is reduced, as indicated at 13, and also provided with longitudinal ribs or corrugations. It has been found that such reduction of diameter of the end of the roller is very important in small mills, since it enables a small quantity of grain to be fed through the machine by adjusting the slide 17 so as to cover the larger portion of said roller. The spring-plate 14 coacts with the reduced portion of the roller with substantially the same effect as the side spring-plates 12 with the remaining portion of the roller. Underlying the reduced end of the roller 11 is an end spring-plate 14, which is secured at one end to the inside of the casing, the free edge thereof underlying the side spring-plates and adapted to yield more or less when said plates are pressed downward. The plate 14 inclines downwardly toward the central portion of the hopper, so as to discharge the material passing thereover at a corresponding point. Two spring-plates 12 are required in order that the roller 11 may be rotated in either direction.

Located beneath the roller 11 and spring-plates 12 and 14 is a series of transverse rods or wires 15. These rods have their ends fitted in the side portions of the casing 1 and are arranged in a common plane, said rods being inclined downwardly toward one side of the casing, so that nails, spikes, screws, and other hard objects falling thereon will gravitate toward the lower ends of said rods and not interfere with the downward passage of the material in the hopper. The corrugations of the roller cause such objects as are above enumerated to assume a longitudinal position in the casing, and therefore when such objects are discharged from the roller they fall crosswise upon the rods 15. One end of the hopper is provided with a door 16, hingedly connected thereto and adapted to be opened for giving access to the rods 15, thus enabling the objects lying thereon to be removed. Arranged above the roller 11 is a regulating-slide 17, which slides through an opening 18 in one end of the casing and whose function is to regulate the feed to the roller. The slide 17 is provided with a finger-hold 19 at its outer edge, and along its longitudinal edge it has a number of notches 20 for engagement with a pivoted latch 21, adjacent to the opening 18, thus enabling the slide to be adjusted to any point and held. In this manner the size of the opening above the roller 11 may be regulated to suit circumstances.

22 designates a hook pivoted to the casing, the end of which is adapted to engage a socket in the door 16 for holding the latter in its opened position. The casing 1 is also provided at one side with a door 23, adapted to be held closed by means of a spring-latch 24 and capable of being opened for giving access to the roller 11 and casing above the slide 17.

The bottom of the casing 1 is inclined or oblique, being provided at its uppermost edge with a pair of headed studs or screws 25, adapted to engage in keyhole-slots 26 in the bottom 27. The bottom 27 is preferably constructed from sheet metal and is inclined to correspond with the inclination of the bottom of the casing. The bottom 27 is also provided with side flanges 28, which embrace the casing 1 upon opposite sides, thus insuring the gravitation of the contents of the casing toward the lower or discharge end of the bottom 27.

The feed-regulator hereinabove described may be used in connection with a feed-mill operated by wind-power or any other suitable motor.

Having thus described our invention, what we claim as new, and desire to secure by Letters Patent, is—

1. In a feed-regulator, the combination with a suitable casing, of a fluted feed-roller mounted therein and having one end reduced in size, and a spring-plate underlying the reduced end of said roller, substantially as described.

2. In a feed-regulator, the combination with the casing and the feed-roller therein, of the series of rods arranged crosswise beneath the roller and forming an inclined plane from one side of the casing to the other, as shown and described.

3. In a feed-regulator, the combination with the rotatable, corrugated roller, having a reduced end portion as described of the slide 17 arranged above the roller, and a spring-plate arranged beneath the reduced portion, as shown and described.

In testimony whereof we have signed this specification in the presence of two subscribing witnesses.

OLAUS JOHNSON.
PEDER P. HOLT.

Witnesses:
S. C. LOUGH,
T. E. BERGE.